United States Patent [19]
Aftanas

[11] Patent Number: 5,826,766
[45] Date of Patent: Oct. 27, 1998

[54] VEHICLE ARTICLE CARRIER

[75] Inventor: Jeffrey M. Aftanas, Sterling Heights, Mich.

[73] Assignee: JAC Products, Inc., Ann Arbor, Mich.

[21] Appl. No.: 911,377

[22] Filed: Aug. 14, 1997

Related U.S. Application Data

[63] Continuation-in-part of Ser. No. 838,710, Apr. 9, 1997, abandoned, and a continuation-in-part of Ser. No. 818,493, Mar. 14, 1997, abandoned.

[60] Provisional application No. 60/026,820 Sep. 27, 1996.

[51] Int. Cl.⁶ .................................................. B60R 9/045
[52] U.S. Cl. ............................................ 224/321; 224/322
[58] Field of Search .................................. 224/309, 315, 224/320, 321, 322, 325, 326

[56] References Cited

U.S. PATENT DOCUMENTS

| | | |
|---|---|---|
| Re. 26,309 | 11/1967 | Heard . |
| 160,462 | 3/1875 | Palmer . |
| D. 212,186 | 9/1968 | Bott . |
| D. 314,541 | 2/1991 | Bott . |
| D. 314,542 | 2/1991 | Bott . |
| D. 317,744 | 6/1991 | Bott . |
| 2,121,531 | 6/1938 | Murphy . |
| 2,663,472 | 12/1953 | Belgau . |
| 2,688,504 | 9/1954 | Parker . |
| 3,165,353 | 1/1965 | Weise . |
| 3,212,457 | 10/1965 | Looker . |
| 3,227,102 | 1/1966 | Shook . |
| 3,241,501 | 3/1966 | Watts . |
| 3,399,635 | 9/1968 | Heard . |
| 3,554,416 | 1/1971 | Bott . |
| 3,721,200 | 3/1973 | Schmidt . |
| 3,772,939 | 11/1973 | Freads et al. . |
| 3,776,437 | 12/1973 | Carney . |
| 3,782,295 | 1/1974 | Balinski . |
| 3,952,671 | 4/1976 | Verde . |
| 4,020,769 | 5/1977 | Keir . |
| 4,099,658 | 7/1978 | Bott . |
| 4,132,335 | 1/1979 | Ingram . |
| 4,133,465 | 1/1979 | Bott . |
| 4,162,755 | 7/1979 | Bott . |
| 4,182,471 | 1/1980 | Bott . |
| 4,243,253 | 1/1981 | Rogers, Jr. . |
| 4,245,764 | 1/1981 | Kowalski et al. . |
| 4,256,424 | 3/1981 | Knox et al. . |
| 4,269,340 | 5/1981 | Kowalski et al. . |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,396,175 | 8/1983 | Long et al. . |
| 4,406,386 | 9/1983 | Rasor et al. . |

(List continued on next page.)

FOREIGN PATENT DOCUMENTS 672749   of 1964   Italy .

*Primary Examiner*—Allan N. Shoap
*Assistant Examiner*—Gregory Vidovich
*Attorney, Agent, or Firm*—Harrness, Dickey & Pierce, PLC

[57] ABSTRACT

A vehicle article carrier having a pair of slats, at least one cross bar and a pair of bracket members secured to the cross bar for adjustably positioning the cross bar along the slats. Each of the bracket members includes a housing having a camming portion and an actuating member which may be rotated between locked and unlocked positions. The actuating member includes a securing post which is attached to a flexible locking plate. When in the locked position, portions of the locking plate engage with the slat to clamp the bracket member to the slat while the securing post extends into an aperture in the slat to positively prevent movement of the bracket member along the slat. Moving the actuating member to its unlocked position causes the locking plate to be flexed to cause the portions which were previously in clamping engagement with the slat are urged out of clamping engagement generally simultaneously with lifting of the securing post out of the aperture in the slat. In this position the bracket member can be slidably repositioned along the slat.

30 Claims, 10 Drawing Sheets

U.S. PATENT DOCUMENTS

| | | |
|---|---|---|
| 4,431,123 | 2/1984 | Bott . |
| 4,448,337 | 5/1984 | Cronce . |
| 4,469,261 | 9/1984 | Stapleton et al. . |
| 4,473,178 | 9/1984 | Bott . |
| 4,493,470 | 1/1985 | Engel . |
| 4,496,271 | 1/1985 | Spinosa et al. . |
| 4,500,020 | 2/1985 | Rasor . |
| 4,509,888 | 4/1985 | Sheek . |
| 4,516,710 | 5/1985 | Bott . |
| 4,650,383 | 3/1987 | Hoff . |
| 4,684,048 | 8/1987 | Bott . |
| 4,688,843 | 8/1987 | Hall . |
| 4,708,549 | 11/1987 | Jensen . |
| 4,754,905 | 7/1988 | Bott . |
| 4,771,969 | 9/1988 | Dowd . |
| 4,838,467 | 6/1989 | Bott et al. . |
| 4,899,917 | 2/1990 | Bott . |
| 4,911,348 | 3/1990 | Rasor et al. . |
| 4,967,945 | 11/1990 | Bott . |
| 4,972,983 | 11/1990 | Bott . |
| 4,982,886 | 1/1991 | Cucheran . |
| 5,082,158 | 1/1992 | Bott . |
| 5,190,198 | 3/1993 | Cucheran . |
| 5,326,007 | 7/1994 | Pudney et al. . |
| 5,375,750 | 12/1994 | Mandarino et al. . |
| 5,385,285 | 1/1995 | Cucheran et al. . |
| 5,470,003 | 11/1995 | Cucheran . |
| 5,474,217 | 12/1995 | Mandarino et al. . |
| 5,553,761 | 9/1996 | Audoire et al. ............... 224/321 |
| 5,579,970 | 12/1996 | Cucheran et al. . |
| 5,622,298 | 4/1997 | Cucheran et al. . |

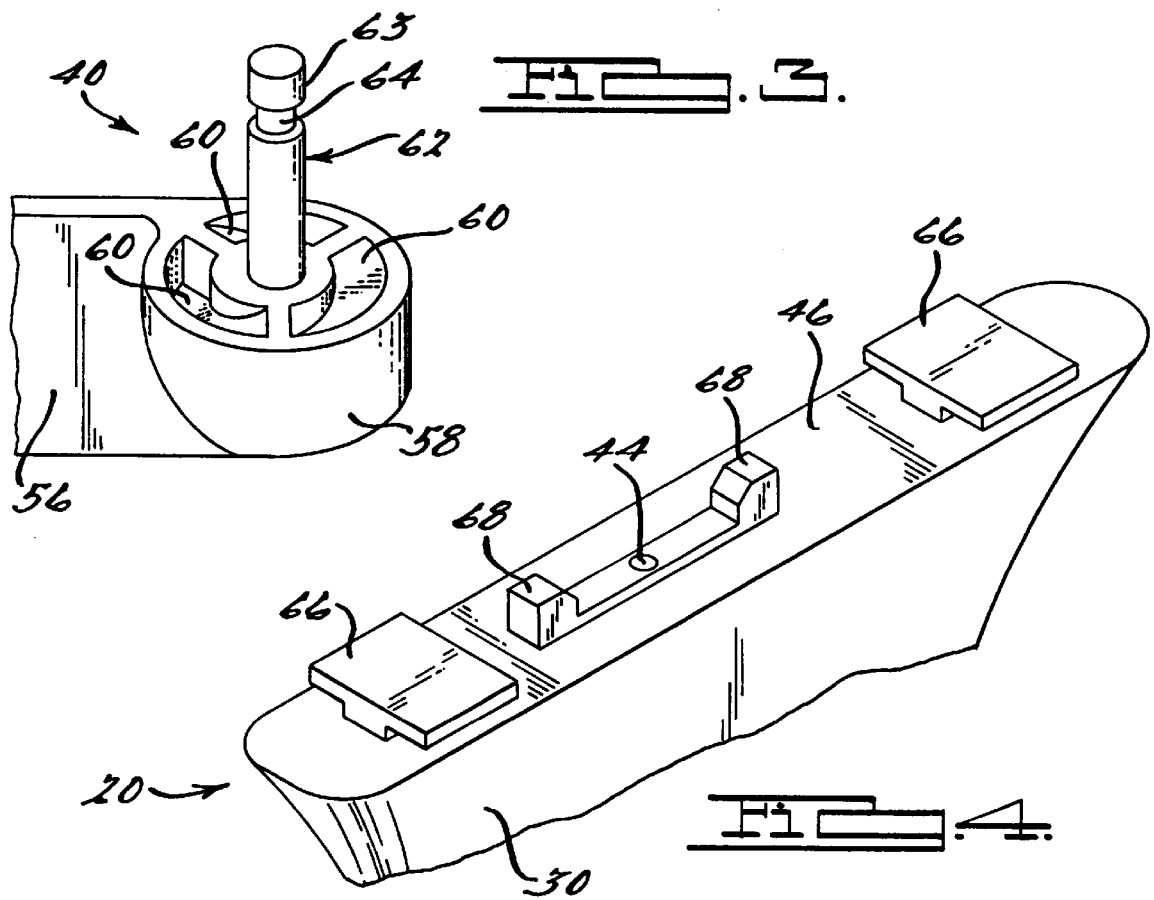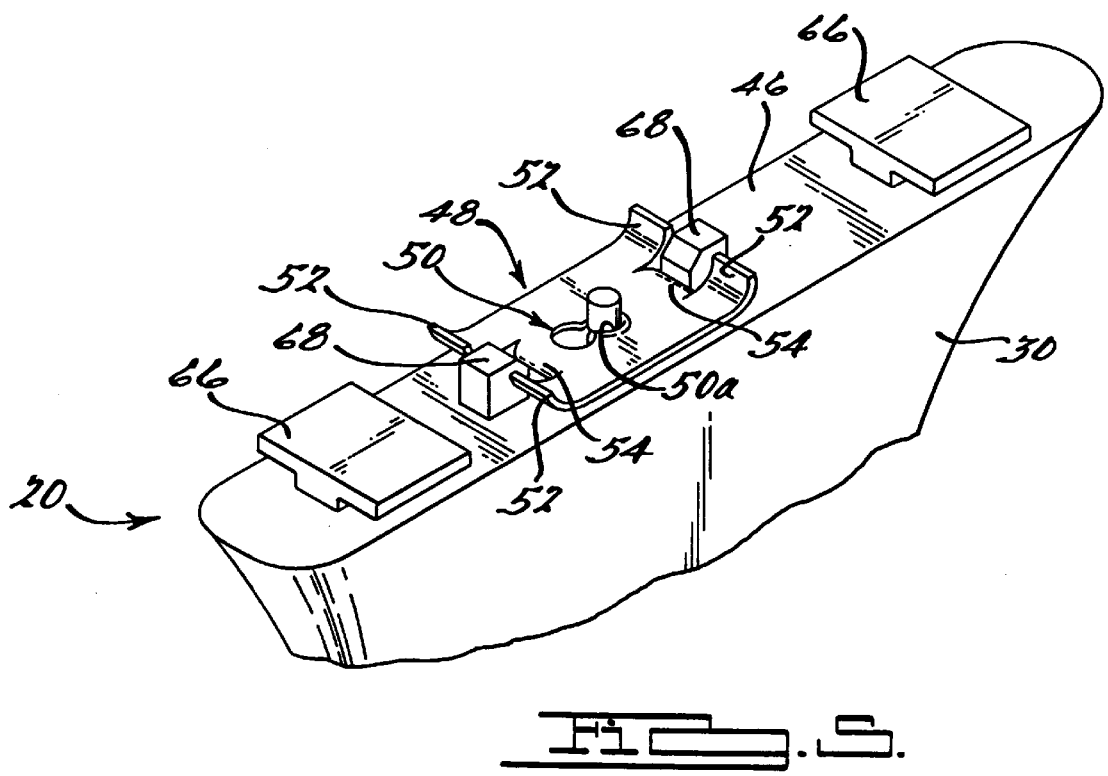

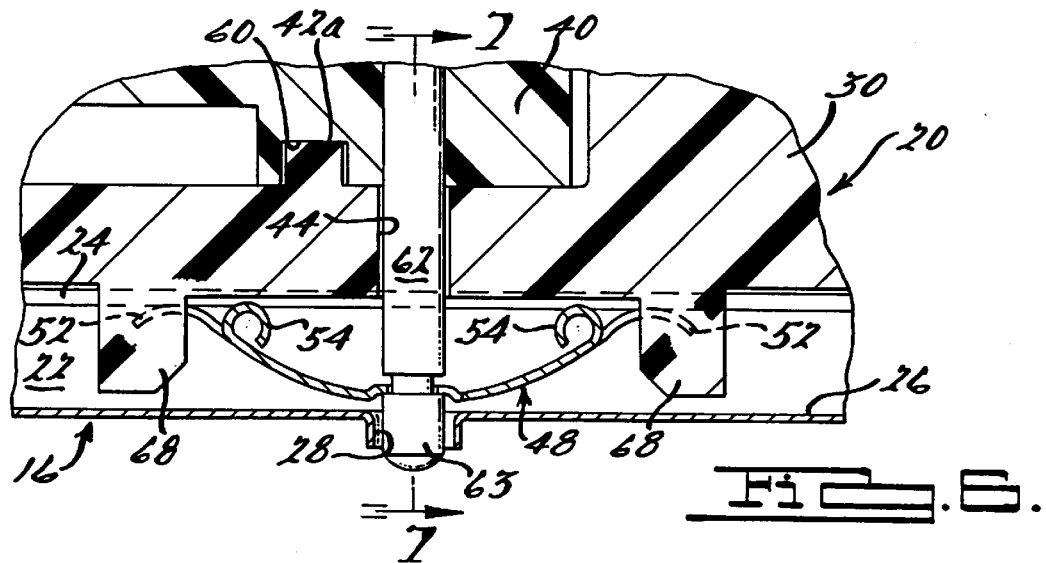
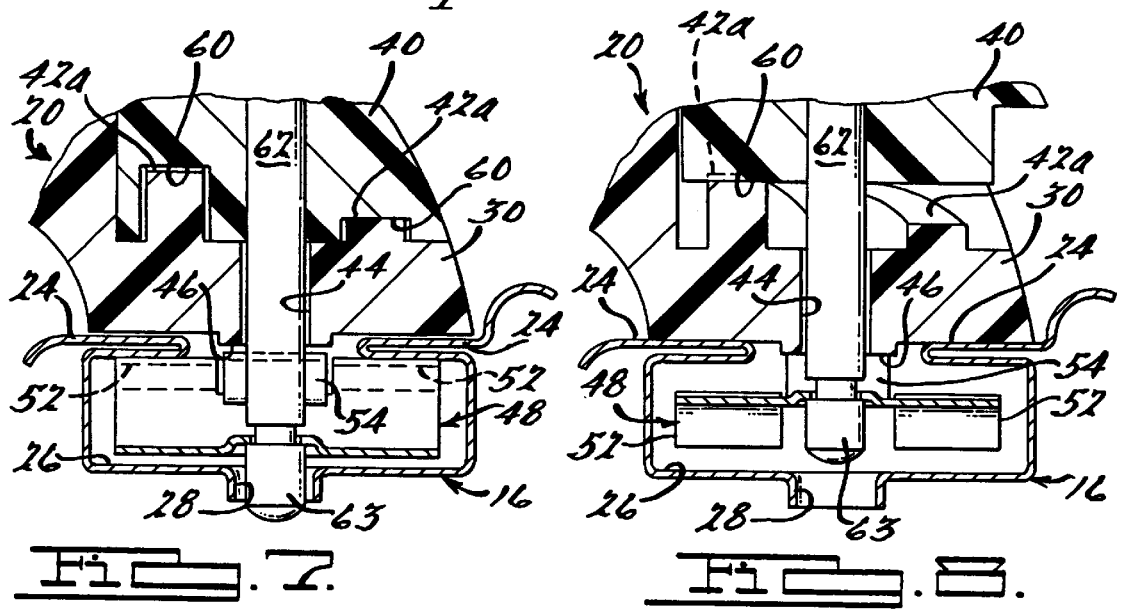
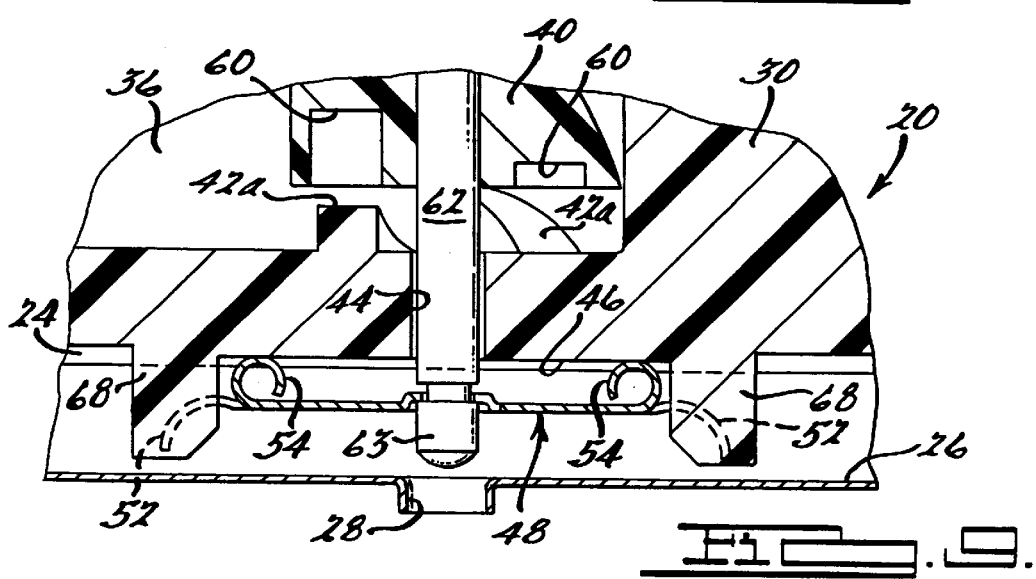

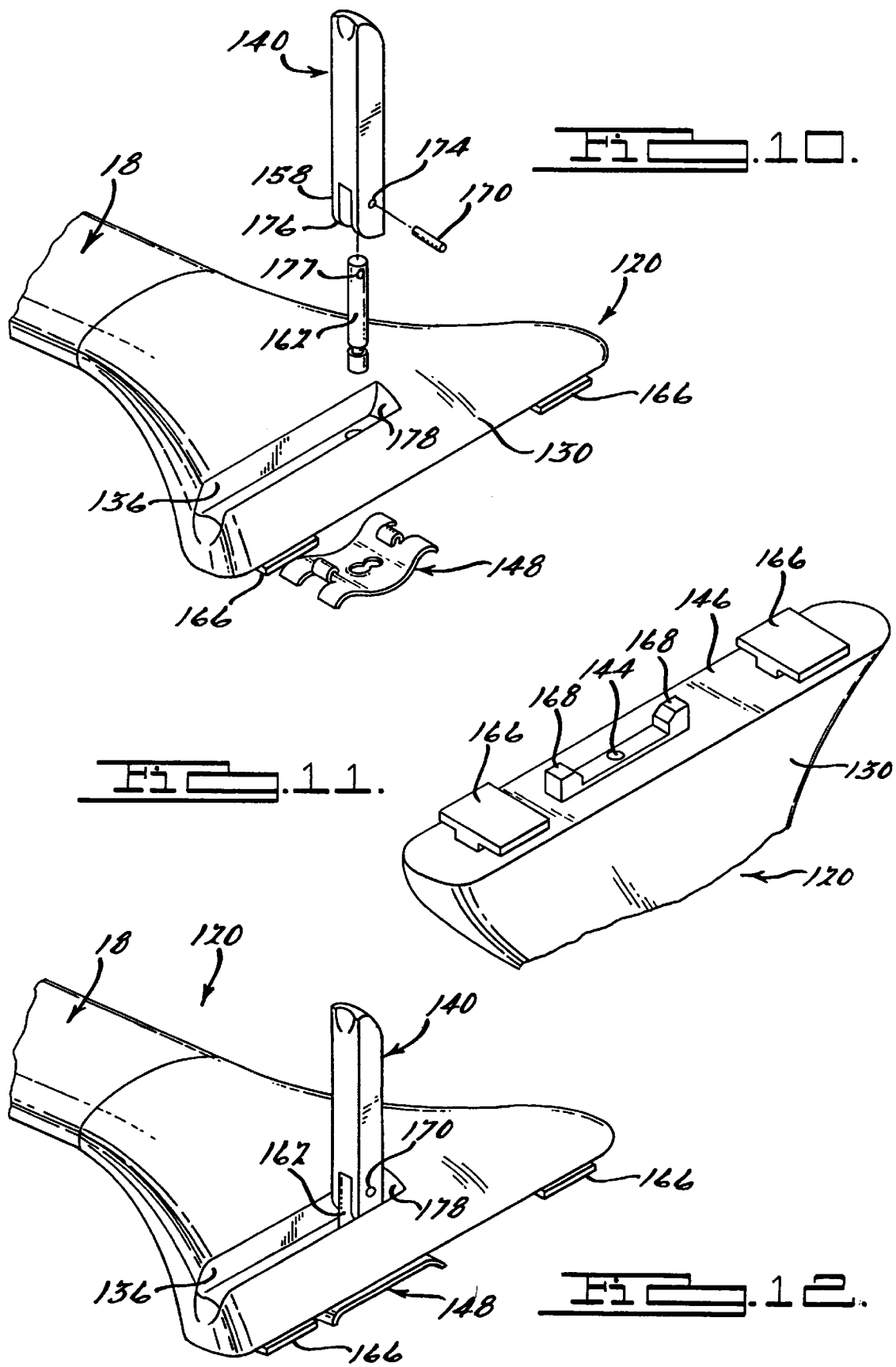

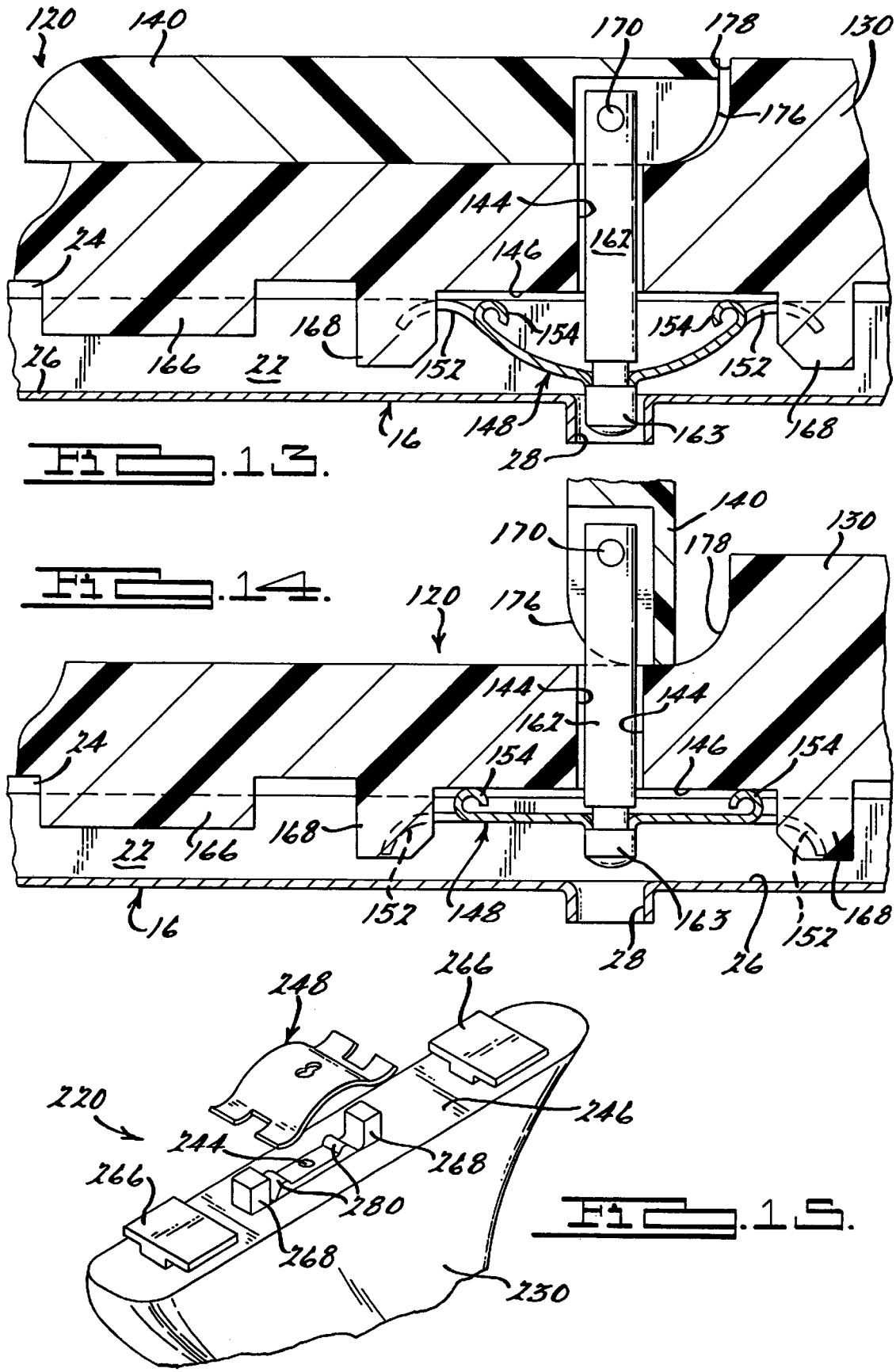

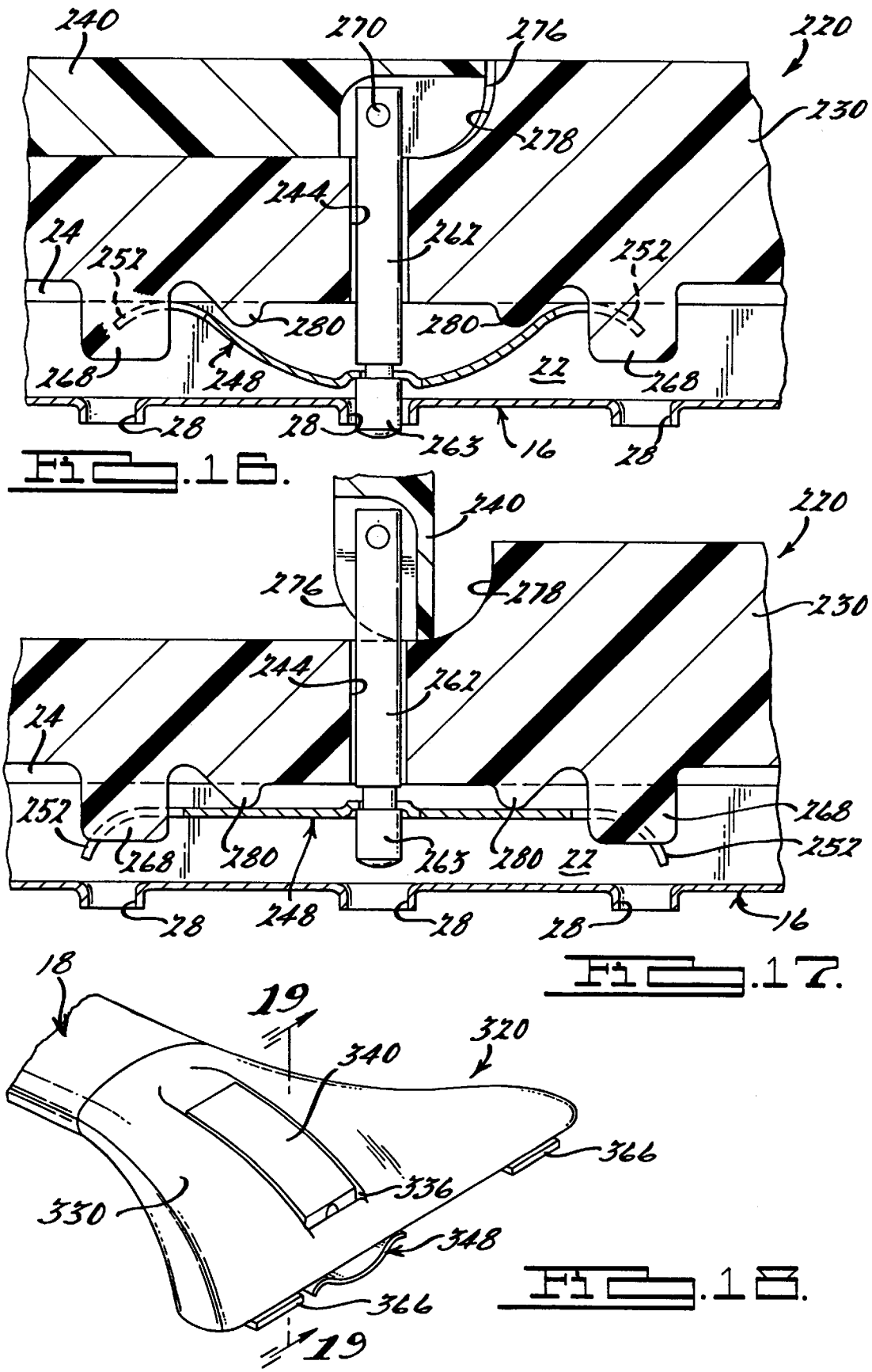

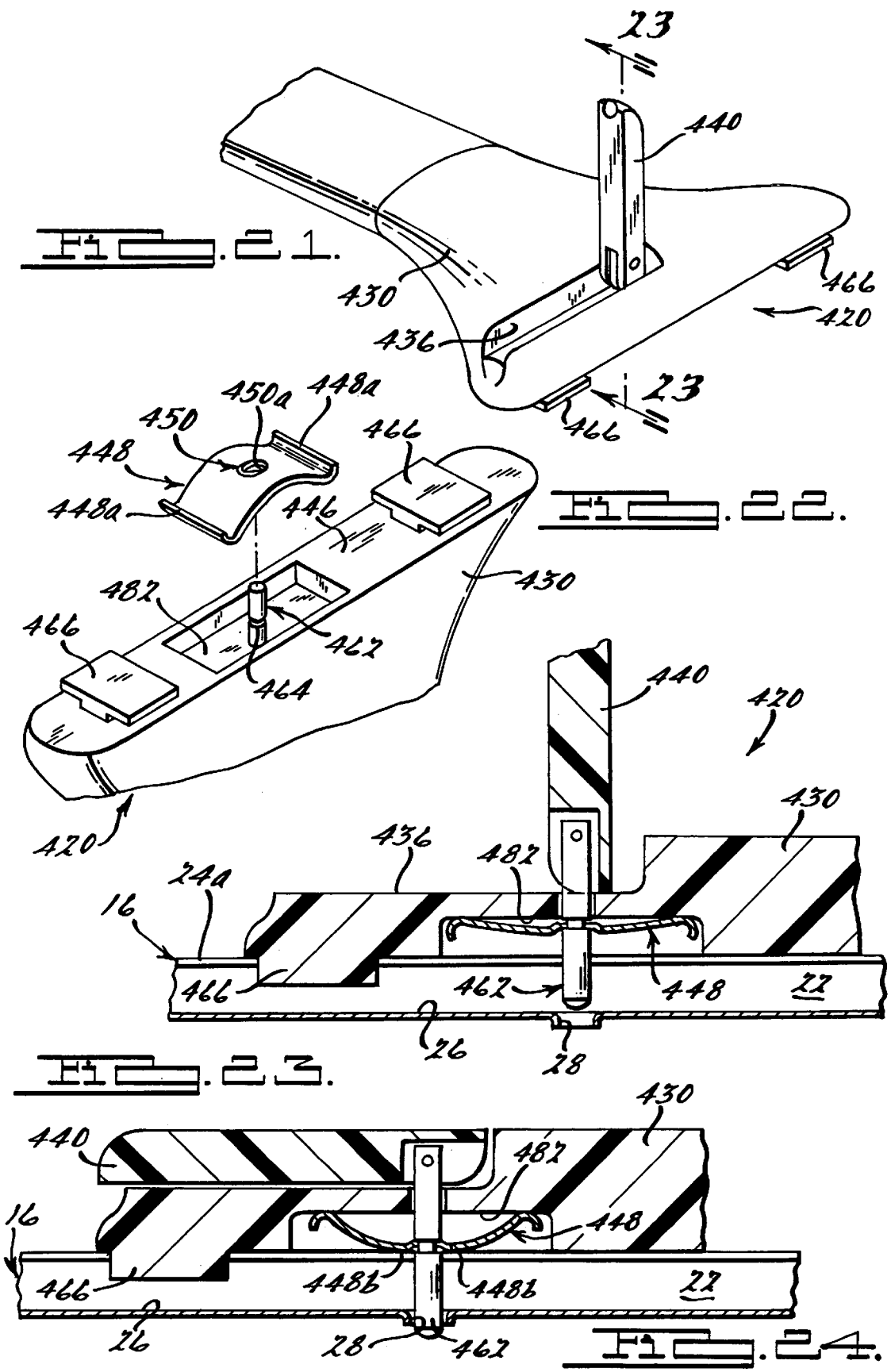

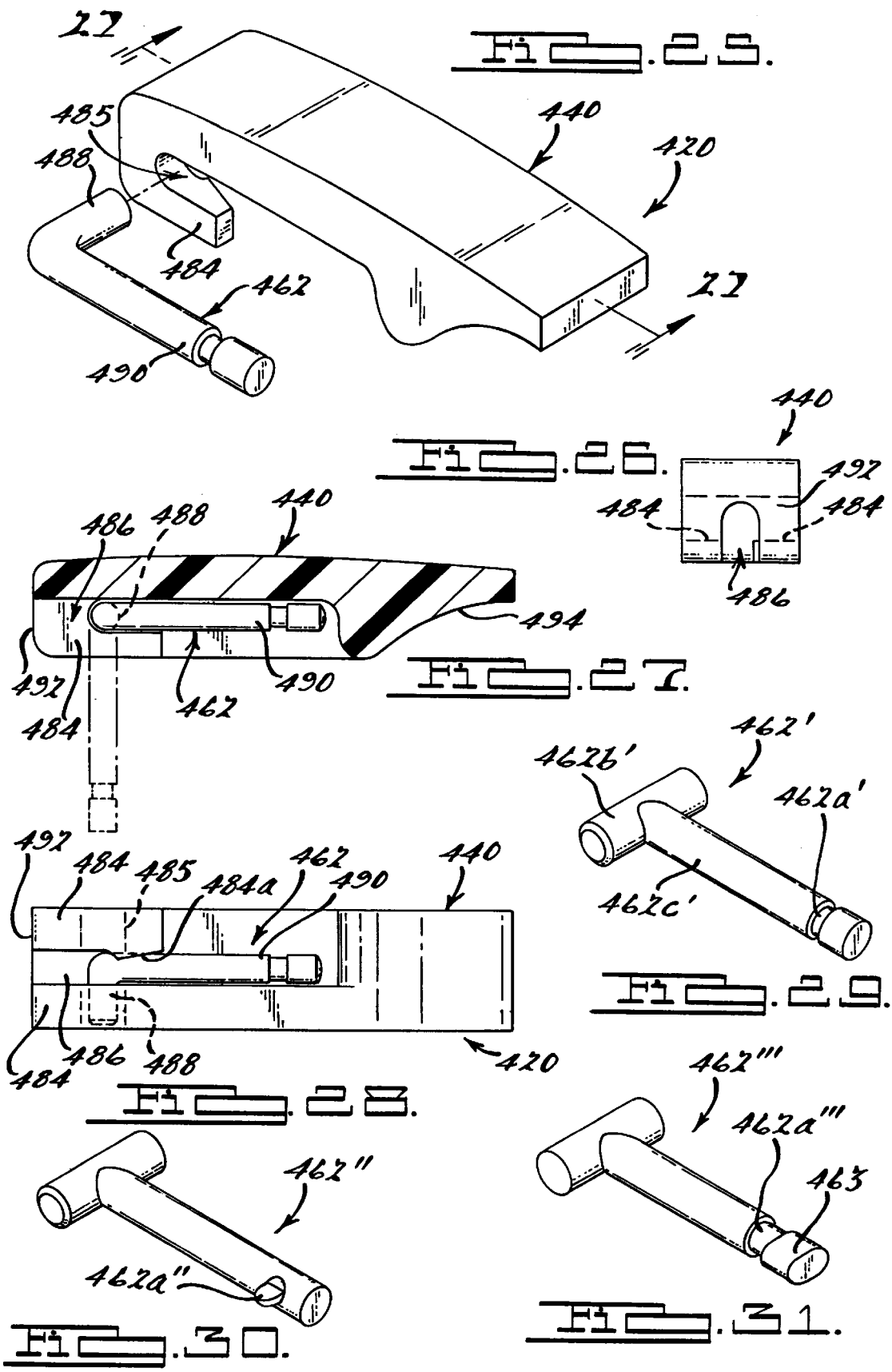

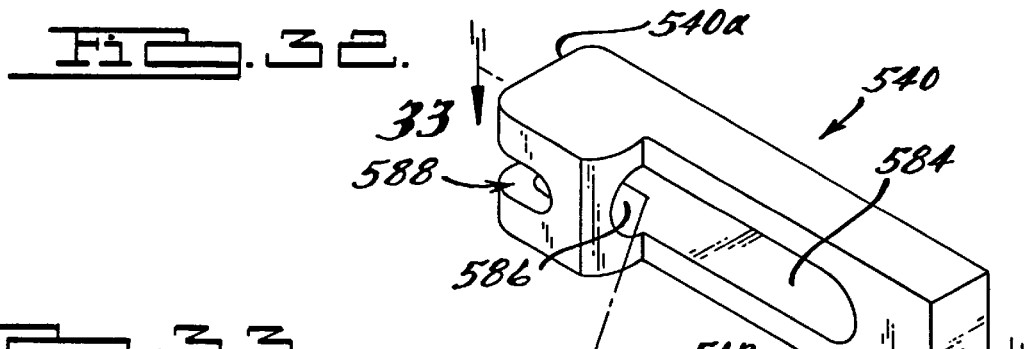
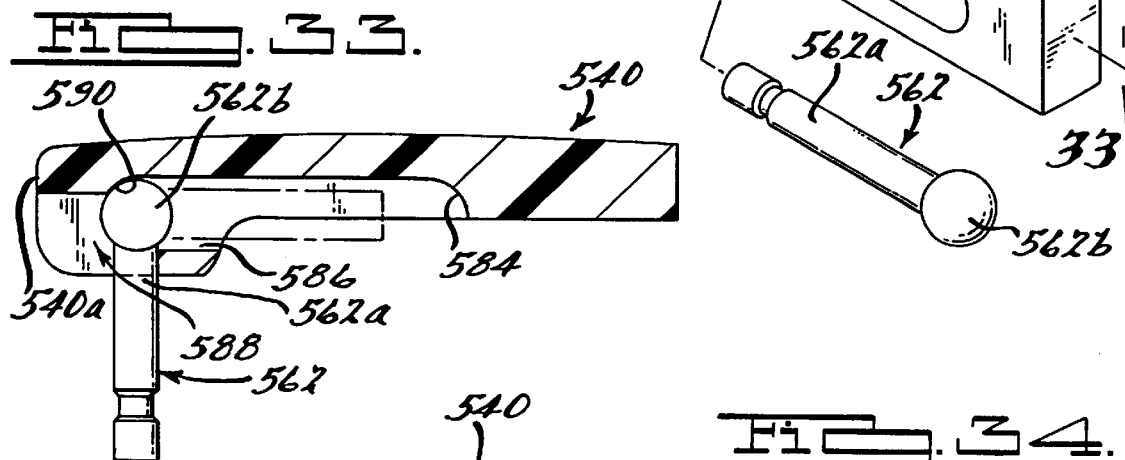
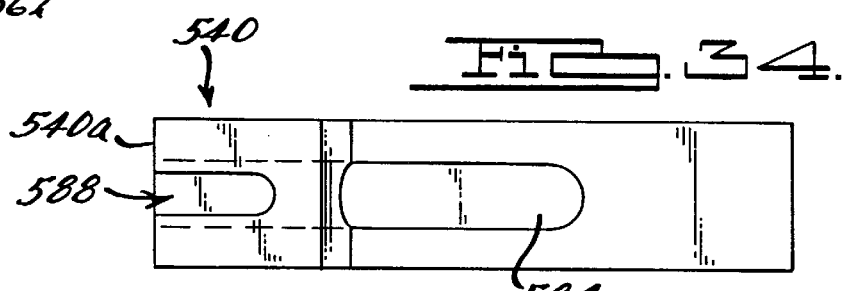
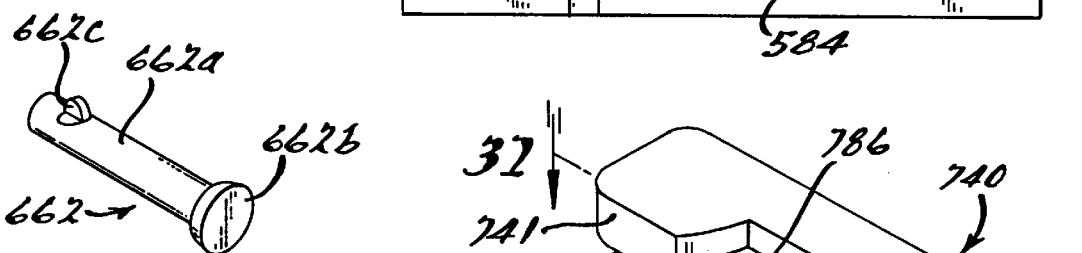
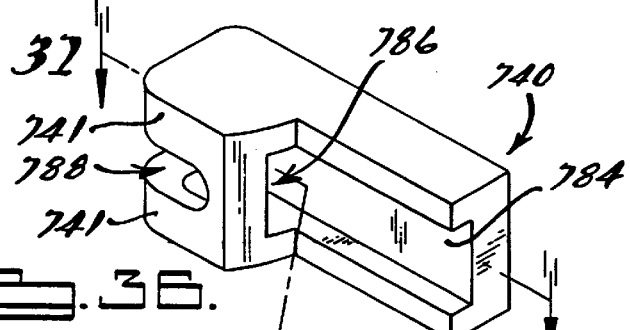
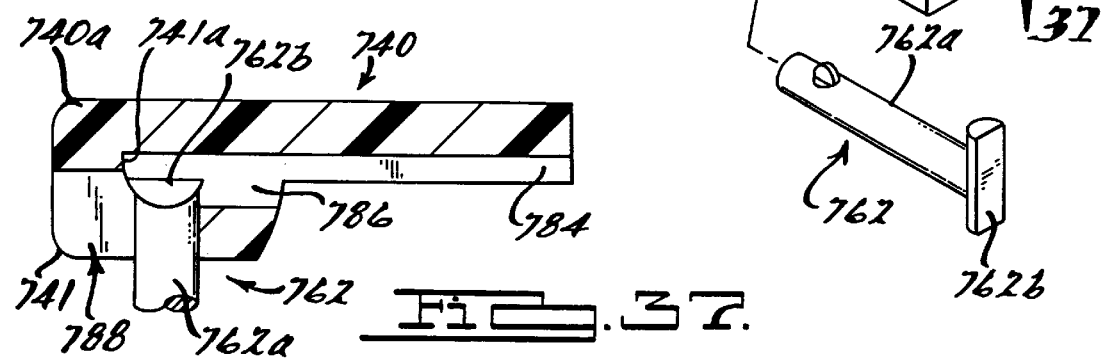

VEHICLE ARTICLE CARRIER

CROSS REFERENCE TO RELATED APPLICATION

This application is a continuation in part of U.S. application Ser. No. 08/838,710, filed Apr. 9, 1997, now abandoned, and a continuation in part of application Ser. No. 08/818,493, filed Mar. 14, 1997, now abandoned, which claims priority from provisional application Ser. No. 60-026,820 filed Sep. 27, 1996.

BACKGROUND OF THE INVENTION

1. Technical Field

This invention relates to vehicle article carriers, and more particularly to a vehicle article carrier having one or more cross bars which are adjustably positionable along a pair of slats to accommodate articles of widely varying sizes and shapes.

2. Discussion

Vehicle article carriers are used in a wide variety of applications to transport cargo above an exterior body surface of a vehicle such as an automobile. Such vehicle article carriers often include a pair of slats or side rails positioned parallel to one another on the roof of a vehicle and a pair of cross bars extending transversely between the side rails. Most typically, the cross bars are used to support the cargo being transported above the roof of the vehicle to prevent scratching or scuffing of the paint on the vehicle roof.

Some vehicle article carrier systems provide for a longitudinal adjustment along the side rails of one or more of the cross bars. This allows cargo of widely varying shapes and sizes to be transported by modifying the positions of the cross bars to accommodate the dimensions of the articles being transported. Article carriers which provide for some form of longitudinal adjustment of one or more cross bars typically include some form of locking mechanism associated with one of the cross bars for releasably securing the cross bar at a desired location along the slats.

With some vehicle article carriers, at least one cross bar of the carrier is supported by a pair of members which are secured to the slats. In some instances the members are clamped to portions of the slats to prevent movement of their associated cross bar longitudinally along the slats. Some systems alternatively use some form of a locking pin or stud which engages openings drilled or formed in the slats when the members are in their locked positions to prevent movement of the cross bar along the slats. It would be highly desirable, however, to provide a vehicle article carrier which incorporates both forms of locking movements (i.e., both a clamping and a positive pin-in-hole arrangement). Such a locking mechanism would provide the positive securement that a locking pin-in-hole arrangement provides with the added advantage of a clamping mechanism which helps to prevent rattle and vibration of the cross bar relative to the slats to which it is secured. It would also be highly desirable if such a locking mechanism operated to cause these two locking actions to occur substantially simultaneously with a single movement of a manually engageable actuating member.

Since motor vehicles are often used in a wide variety of climates and are subject to the elements (i.e., sleet, snow, ice, etc.), it is also imperative that the locking mechanisms used with the cross bar(s) of a vehicle article carrier be easy to operate without the use of any special tools. Such locking mechanisms must be easy for an individual to manually engage and disengage and further of a construction which is economical and which does not add significantly to the overall cost of the vehicle article carrier system.

Accordingly, it is a principal object of the present invention to provide a vehicle article carrier which includes one or more locking mechanisms for holding a cross bar of the article carrier at a desired position along a pair of slats of the carrier.

It is another object of the present invention to provide a vehicle article carrier having a locking mechanism which allows a user to unlock an associated cross bar from a pair of slats without the use of any special tools, and which further allows the cross bar to be positively secured to the slats without the use of any external tools.

It is still another object of the present invention to provide a locking mechanism for a vehicle article carrier which permits a cross bar associated with the locking mechanism to be released manually with a single, relatively short movement of an actuating member thereof, and similarly locked with a correspondingly short movement of the actuating member.

It is still another object of the present invention to provide a locking mechanism for a vehicle article carrier which assumes a normally locked position whenever an actuating member of the locking mechanism is not being manually engaged by the user.

It is yet another object of the present invention to provide a locking mechanism for a vehicle article carrier that provides a positive locking engagement with its associated slat and which further helps to prevent rattle and/or vibration of the cross bar and locking mechanism relative to the slats when the vehicle traverses rough terrain.

It is still another object of the present invention to provide a locking mechanism for a vehicle article carrier which is constructed relatively inexpensively from a relatively small number of component parts and capable of being assembled quickly and easily in a relatively short time span.

SUMMARY OF THE INVENTION

The above and other objects are provided by a vehicle article carrier in accordance with preferred embodiments of the present invention. If one preferred embodiment the vehicle article carrier incorporates a pair of slats which are fixedly secured to an outer body surface, such as a roof, of a vehicle. Each slat includes at least one ledge portion to which a bracket member may be clamped and a bottom wall portion having a plurality of spaced apart apertures. At least one cross bar is provided which has a length sufficient to substantially span the distance between the slats when the slats are fixedly secured to the outer body surface. The cross bar is supported at each of its ends on the slats by a pair of bracket members. Each bracket member includes a housing having a manually engageable locking mechanism. The locking mechanism includes an actuating member which may be grabbed by a user with the fingers of a single hand and moved between locked and unlocked positions.

Each bracket member also includes a camming surface formed in a recess of its housing and the actuating member includes a securing post which projects through an opening in the bracket member down into the channel of its associated slat. A flexible clamping plate is disposed within the channel and secured to the securing post.

When the actuating member is moved from its locked to its unlocked position the camming surface causes the securing post to be moved out of engagement with one of the apertures with which it is engaged. Generally simultaneously, this causes the flexible locking plate to be flexed such that portions of the locking plate which were previously in clamping engagement with at least one ledge of the slat are urged out of clamping engagement with the slat. While the actuating member is in its unlocked position, the bracket member can be slid easily longitudinally along its associated slat for repositioning.

When it is desired to lock the bracket member to its associated slat the actuating member is moved from its unlocked to its locked position. This causes the flexible locking plate to become unflexed and portions thereof clampingly engage the ledge of the associated slat. Generally simultaneously, the securing post is drawn towards the bottom wall of the slat and into one of the apertures in the slat. It will be appreciated that it may be necessary to adjust the longitudinal position of the bracket member on the slat slightly if the securing post is not positioned perfectly over one of the apertures before the securing post can pass through one of the apertures. When the actuating member is moved fully into its locked position, the securing post is engaged within one of the apertures while the flexible locking plate is clampingly engaged with the ledge of the slat. The bracket member is thus positively secured to the slat by engagement of the securing post within one of the apertures in the bottom wall of the slat, while the flexible locking plate clamps the housing of the bracket member to the slat to prevent any potential rattling or vibration of the bracket member and cross bar relative to the slat.

In another preferred embodiment the actuating member includes an endmost portion which has a curved lower end. As the actuating member is moved from its locked position to its unlocked position it lifts the securing post pivotally attached at its endmost portion, which causes flexing of the flexible locking plate as the securing post is lifted out of one of the apertures in the slat. In another preferred embodiment the housing of the bracket member includes a pair of protrusions formed on a lower surface thereof which assist in flexing the flexible locking plate when the actuating member is moved to its unlocked position.

In yet another alternative preferred embodiment the bracket member includes a recess formed at a lower surface thereof. Within the recess is placed a flexible locking plate which is held within the recess by attachment to a locking post. The locking post is movable reciprocally by moving an actuating member between locked and unlocked positions. In this embodiment the flexible locking plate includes portions which are in contact with an upper surface of a slat upon which the bracket member is disposed when the actuating member is in the locked position. This prevents rattling or vibration of the bracket member relative to the slat. When in the locked position, the locking post extends into an opening formed in a bottom wall of the slat. When the actuating member is moved into its open or unlocked position, the portions of the flexible locking plate in contact with the upper surface of the slat are drawn away from the upper surface of the slat and the locking post is removed from its opening in the bottom wall of the slat. The bracket member can now be slidably moved along the slat and repositioned. Accordingly, with this embodiment the flexible locking plate does not reside within the channel of the slat but rather merely contacts the upper surface of the slat.

The preferred embodiments all provide a locking system for a bracket member of a vehicle article carrier which is constructed from a very small number of component parts and is therefore less costly to manufacture than other forms of vehicle article carriers. It is a principal advantage of the present invention that a locking mechanism is provided which accomplishes both a positive pin-in-hole locking arrangement together, and generally simultaneously, with a clamping of the bracket member to its associated slat all in one easy, manual movement of an actuating movement. This dual locking action completely or substantially eliminates rattle, vibration and other objectionable characteristics which other forms of prior art vehicle article carriers are subject to.

BRIEF DESCRIPTION OF THE DRAWINGS

The various advantages of the present invention will become apparent to one skilled in the art by reading the following specification and subjoined claims and by referencing the following drawings in which:

FIG. 3 is a fragmentary perspective view of a portion of the actuating member of the bracket member;

FIG. 4 is a fragmentary perspective view of a lower surface portion of the bracket member;

FIG. 5 is a perspective view of the bracket member of FIG. 4 showing a flexible locking plate secured thereto;

FIG. 6 is a partial cross-sectional side view in accordance with section line 6—6 in FIG. 1 of the bracket member in a locked position;

FIG. 7 is a cross partial sectional end view in accordance with section line 7—7 in FIG. 6 showing the bracket member in the locked position;

FIG. 8 is a partial cross-sectional end view of the bracket member of FIG. 7 showing the bracket member in an unlocked position;

FIG. 9 is a partial side cross sectional view of the bracket member of FIG. 8 showing the bracket member in the unlocked position;

FIG. 10 is an exploded perspective view of a bracket member in accordance with an alternative preferred embodiment of the present invention;

FIG. 11 is a perspective view of the bracket member of FIG. 10 illustrating a lower surface portion of the bracket member;

FIG. 12 is a perspective view of the bracket member of FIG. 10 with an actuating member thereof in an unlocked position;

FIG. 13 is a partial side cross-sectional view of the bracket member of FIG. 12 with the actuating member in the locked position;

FIG. 14 is a partial cross sectional side view of the bracket member of FIG. 13 showing the bracket member in an unlocked position;

FIG. 15 is a perspective view of a bracket member in accordance with another alternative preferred embodiment of the present invention;

FIG. 16 is a partial side cross-sectional view of the bracket member of FIG. 15 showing the bracket member in a locked position;

FIG. 17 is a partial side cross-sectional view of the bracket member of FIG. 16 showing the bracket member in an unlocked position;

FIG. 18 is a perspective view of another alternative preferred embodiment of the present invention;

FIG. 21 is a perspective view of an alternative preferred embodiment of the present invention;

FIG. 22 is a bottom perspective view of the bracket member shown in FIG. 21 with the flexible locking plate thereof illustrated in exploded fashion;

FIG. 23 is a partial side cross sectional view in accordance with section line 23—23 in FIG. 21 showing the bracket member in the unlocked position; and FIG. 24 is a partial cross sectional view showing the bracket member in FIG. 23 in the locked position.

FIG. 25 is a perspective view of an actuating member in accordance with an alternative preferred embodiment of the present invention;

FIG. 26 is an end elevational view of the actuating member without the locking pin;

FIG. 27 is a partial side cross-sectional view of the actuating member in accordance with section line 27—27 in FIG. 25, and showing the locking pin in elevation;

FIG. 28 is a bottom elevational view of the actuating member and the locking pin of FIG. 25;

FIG. 29 is a perspective view of an alternative preferred form of the locking pin;

FIG. 30 is a perspective view of another alternative preferred form of the locking member;

FIG. 31 is a perspective view of still another alternative preferred form of the locking pin;

FIG. 32 is a perspective view of another alternative preferred form of the actuating member and locking pin of the present invention;

FIG. 33 is a partial side cross-sectional view of the actuating member in accordance with section line 33—33 in FIG. 32;

FIG. 34 is a bottom elevational view of the actuating member;

FIG. 35 is a perspective view of an alternative preferred form of the locking pin;

FIG. 36 is a perspective view of yet another alternative preferred form of actuating member and locking pin; and FIG. 37 is a partial cross-sectional side view of the actuating member in accordance with section line 37—37 in FIG. 36.

DETAILED DESCRIPTION OF THE PREFERRED EMBODIMENTS

Figure 1:
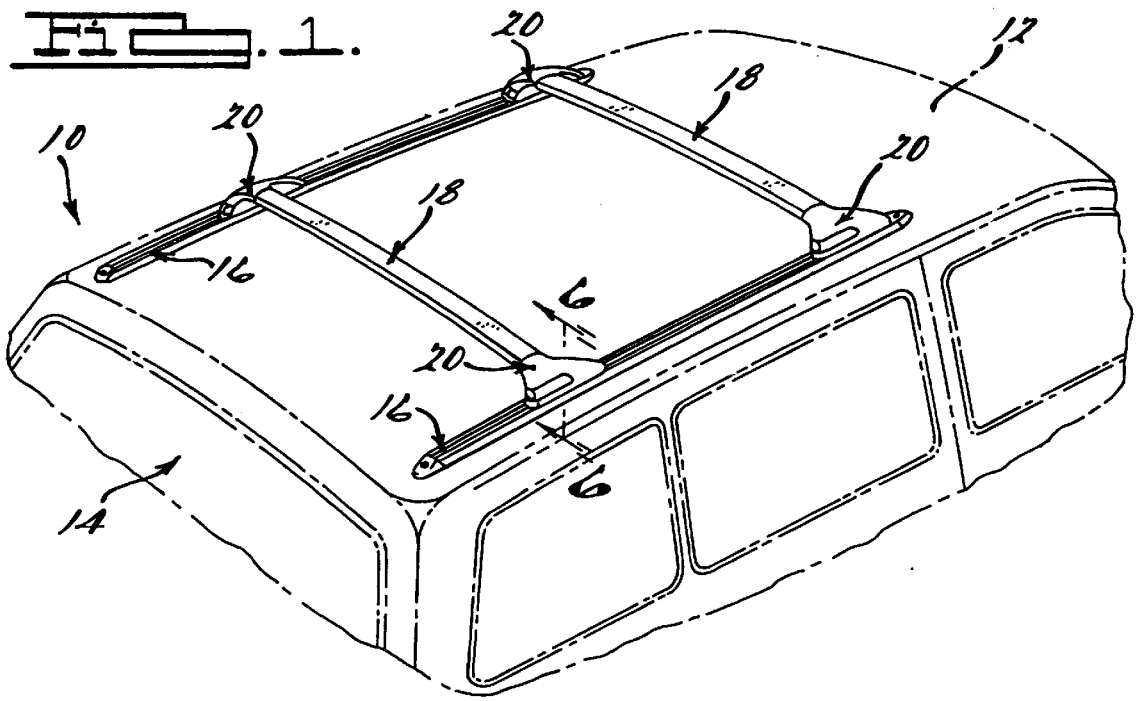
FIG. 1 is a perspective view of a portion of a vehicle showing a vehicle article carrier in accordance with the preferred embodiment of the present invention mounted on a roof portion of the vehicle.

Referring to FIG. 1, there is shown a vehicle article carrier 10 in accordance with a preferred embodiment of the present invention. The article carrier 10 is shown mounted on an outer body surface 12 of a vehicle 14. The outer body surface 12 is illustrated in FIG. 1 as a roof portion of a vehicle 14, although it will be appreciated that the apparatus 10 could also be secured to a rear deck lid of a vehicle with minor modifications. Accordingly, the apparatus 10 is not limited to placement only on a roof of a vehicle.

The apparatus 10 generally includes a pair of slats 16 which are adapted to be fixedly secured to the outer body surface 12 by suitable, conventional fastening elements such as threaded fasteners and nuts. Each of the slats 16 has a length which extends a major portion of the overall length of the outer body surface 12. Two cross bars 18 are included which each have an overall length sufficient to substantially span the distance between the slats 16. Attached to an outermost end portion of each slat 18 is a bracket member 20. The bracket members 20 support their associated cross bar 18 above the outer body surface 12 and permit each of the cross bars 18 to be adjustably positioned along the slats 16. It will be appreciated that while each of the cross bars 18 is illustrated with a pair of bracket members 20 at its outermost ends to allow adjustable positioning, that one of the cross bars 18 could just as easily be fixedly secured to the slats 16 such that it is not movable along the slats 16. Thus, the apparatus 10 is not limited to the use of two adjustable cross bars but instead may incorporate one fixed cross bar and one adjustable cross bar. In some instances this may be the preferred arrangement to even further reduce the cost of the overall article carrier system 10.

Figure 2:
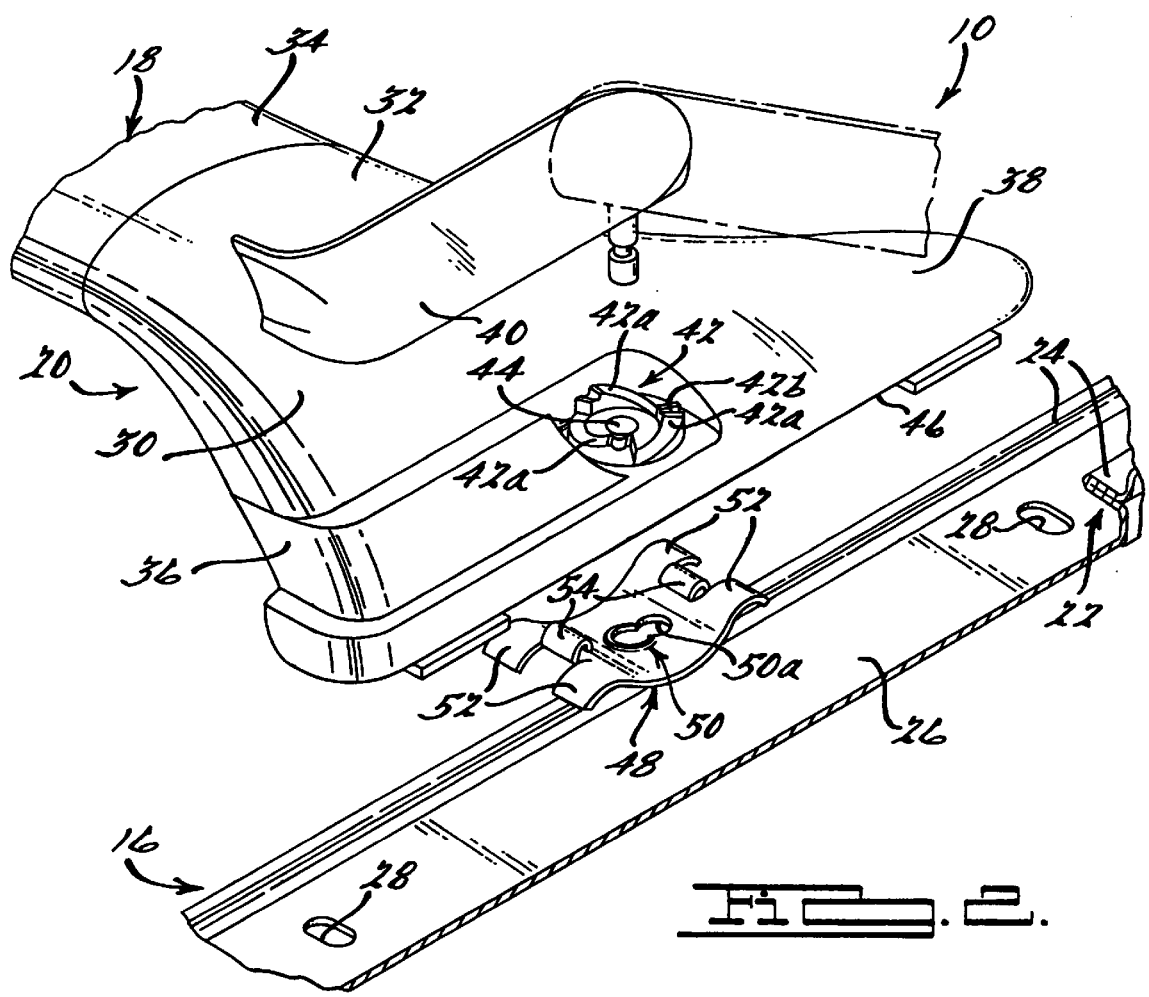
FIG. 2 is an exploded perspective view of one bracket member of the present invention.

Referring to FIG. 2, each slat 16 comprises a channel 22 having a pair of overhanging ledge portions 24 which extend substantially along the entire length of the slat 16. Each slat 16 also has a bottom wall 26 having a plurality of spaced apart apertures 28 formed therein. Although the slat 16 is shown as a roll formed component, it will be appreciated that it could easily be formed by two or more component pieces if desired.

With further reference to FIG. 2, each bracket member 20 forms a locking mechanism which includes a housing 30 having an upper end 32 which is fixedly secured to an outermost end portion 34 of one of the cross bars 18. The housing 30 comprises a gradually curving, aerodynamically efficient and aesthetically pleasing structure and has a recess 36 formed in an outer surface 38 within which an actuating member 40 is nestably disposed. The actuating member 40 is contoured such that it matches the contour of the outer surface 38 of the housing 30 to provide the appearance of an integrally formed component when in its locked position (shown in FIG. 1).

Referring further to FIG. 2, within the recess 36 is an integrally formed camming portion 42 and an opening 44 which extends through a lower surface 46 (also shown in FIGS. 4 and 5) of the housing 30. The camming portion 42 includes a plurality of ramp surfaces 42a which each have a notched portion 42b at an upper end. Each of the ramp surfaces 42a is further arranged in a generally circumferential fashion to circumscribe the opening 44.

With further reference to FIG. 2, each bracket member 20 also includes a flexible locking plate 48 having a key-shaped opening 50, curving corner portions 52 and curving intermediate portions 54 which are formed so as to curve in a direction generally opposite to the curvature of corner portions 52. The flexible locking plate 48 thus forms an H-shaped component having dimensions permitting it to be inserted within the channel 22. The overall width of the flexible locking plate 48 is such that the curving corner portions 52 reside underneath the overhanging ledge portions 24 while the curving intermediate portions 54 extend upwardly between the overhanging ledge portions 24 so as not to contact the ledge portions 24. The flexible locking plate 48 is preferably formed from spring steel in a somewhat modified S-shape, the reasons for which will be described momentarily.

With brief reference to FIG. 3, the actuating member 40 includes a hollowed out portion 56 and an outermost enlarged end portion 58. The enlarged end portion 58 includes a plurality of generally circumferential cam follower grooves 60. Securely affixed to the enlarged end portion 58 is a securing post 62. The securing post 62 is preferably a metal pin or like member which is insert molded with the actuating member 40 so as to be permanently secured within the enlarged end portion 58. The securing post 62 extends generally perpendicularly from the actuating member 40 and has a diameter allowing it to pass through the opening 44 (FIG. 2), through a portion of the key-shaped opening 50 in the flexible locking plate 48 and into one of the apertures 28 in the slat 16. To allow the flexible locking plate 48 to be attached to the securing post 62, a notch 64 is formed on the securing post 62 which engages portion 50*a* (FIGS. 2 and 5) of the locking plate 48. With brief reference to FIG. 5, the flexible locking plate 48 is shown engaged with the securing post 62.

With brief reference to FIGS. 4 and 5, the lower surface 46 of the bracket member housing 30 includes a pair of integrally formed foot portions 66 for helping to prevent the bracket member 20 from being completely lifted off of its associated slat 16. The foot portions 66 slide within the channel 22 and also help to maintain the bracket member 20 in a desired orientation relative to the slat 16. Also integrally formed on the lower surface 46 are protrusions 68 which engage between the corner portions 52 of the locking plate 48 to help maintain the locking plate 48 in a desired orientation relative to the bracket member 20.

With reference to FIGS. 2, 3 and 5, during assembly the actuating member 40 is positioned within the recess 36 in the housing 30 such that the securing post 62 extends through the opening 44, the grooves 60 (FIG. 3) are engaged with the ramp surfaces 42*a*, and the actuating member 40 is in its locked position (shown in FIG. 1) resting within the recess 36. The flexible locking plate 48 is then positioned over the securing post 62 such that a lowermost end portion 63 thereof extends through the key-shaped opening 50 and the notch 64 engages within portion 50*a* of the locking plate 48 when the locking plate is moved laterally just slightly. The locking plate 48 is formed such that it experiences a slight degree of flexing when the actuating member 40 is in its locked position and the locking plate is engaged with the ledges 24. Thus, when in the locked position, the curving intermediate portions 54 are just barely out of contact with the lower surface 46 of the bracket member housing 30.

Referring now to FIGS. 6–9, the degree of flexing of the flexible locking plate 48 and the movement of the securing post 62 can be seen when the actuating member 40 is moved between locked and unlocked positions. With initial reference to FIGS. 8 and 9, before the bracket member 20 is secured to its associated slat 16, the actuating member is moved to its unlocked position (shown in dashed lines in FIG. 2). When the actuating member 40 is moved to its unlocked position the ramp surfaces 42*a* cause the entire actuating member 40, and thus the securing post 62, to be lifted vertically in the drawing of FIG. 8. This draws the curving intermediate portions 54 of the locking plate 48 into contact with the lower surface 46 of the bracket member housing 30 as the approximate midpoint (defined by the key-shaped opening 50) of the locking plate 48 is flexed toward the lower surface 46 of the bracket member housing 30. This flexing action causes a major portion of the locking plate 48 to be straightened out while the curving corner portions 52 flex out of engagement with the overhanging ledge portions 24 of the slat 16. In this position the entire bracket member 20 may be slid into the channel 22 of the slat 16 from one end of the slat 16. It will be appreciated that this action takes place before end caps or other like devices are secured to the outer body surface 12 to close off the ends of each of the slats 16.

With reference to FIGS. 6 and 7, once the bracket member 20 is slid into its associated slat 16 and placed at a desired position along the slat 16 over one of the apertures 28 in the slat 16, the actuating member 40 may be moved to its locked position (i.e., positioned within the recess 36, as shown in FIG. 1). When the actuating member 40 is moved from its unlocked to its locked position, the biasing force provided by the locking plate 48 causes the securing post 62 to be drawn downwardly in the drawings of FIGS. 6 and 7 as the cam follower surfaces 60 ride over the ramp surfaces 42*a*. The upstanding portions 68 prevent the locking plate 48 from rotating as the actuating member 40 is rotated between locked and unlocked positions. As the securing post 62 is lowered into one of the apertures 28, the locking plate 48 is allowed to flex into the position shown in FIGS. 6 and 7. In this position the corner portions 52 forcibly engage the ledges 24 of the slat 16 to clamp the bracket member housing 30 to the slat 16. When the lowermost end portion 63 of the securing post 62 engages within one of the apertures 28, the bracket member 20 is positively prevented from moving along the slat 16.

Referring now to FIGS. 10–14, a bracket member 120 in accordance with an alternative preferred embodiment of the present invention is shown. It will be appreciated that this bracket member 120 is identical to the bracket member 20 of the vehicle article carrier 10 with the exception of how the actuating member of the bracket member 120 is constructed and operates. Accordingly, like components will be designated by the same reference numerals as used in FIGS. 1–9 but increased by 100.

With initial reference to FIG. 10, the housing 130 of the bracket member 120 is identical to the housing 30 shown in FIG. 2 with the exception that the actuating member 140 includes a U-shaped end portion 158 which is pivotally secured to the securing post 162 by a locking pin 170. The locking pin 170 extends through apertures 174 in the actuating member 140 and aperture 177 in the securing post 162 and the actuating member 140 includes a curved camming surface 176. The bracket member housing 130 is substantially identical to the bracket member housing 30 with the exception of the shape of the recess 136 which houses the actuating member 140, the absence of camming portion 42, and a semi-circular surface 178 formed in a portion of the recess.

With reference to FIG. 13, when the actuating member 140 is in its locked position, the securing post 162 is in a lower-most position allowing the curving end portions 152 to clampingly engage the ledges 24 of the slat 16. With reference to FIGS. 12 and 14, as the actuating member 140 is lifted into its unlocked position, the curved camming surface 176 of the actuating member 140 causes the securing post 62 to be lifted vertically in the drawing of FIG. 14. This causes the locking plate 148 to be flexed such that the curving corner portions 152 are urged out of clamping engagement with the ledges 24 of the slat 16. While the actuating member 140 is held in the position shown in FIGS. 12 and 14 the bracket member 120 can be moved slidably along the slat 16.

With brief reference to FIG. 15, a bracket member 220 in accordance with an alternative preferred embodiment of the present invention is shown. The bracket member 220 is substantially identical to the bracket member 120 and like components are designated by reference numerals increased by 100 from those used in connection with FIGS. 10–14.

The bracket member 220 differs from the bracket member 120 in that the lower surface 246 includes a pair of protrusions 280 which are used to assist in flexing the locking plate 248 such that the locking plate becomes clampingly disengaged from the ledges 24 of the slat 16 when the actuating member of the bracket member 220 is urged into its unlocked position.

With reference to FIG. 16, the actuating member 240 of bracket member 220 is shown in its locked position. The curving corner portions 252 are clampingly engaged with the ledges 24 of the slat 16. It will be noted immediately, however, that the flexible locking plate 248 does not include intermediate curving portions 252 as these are not needed when the protrusions 280 are incorporated.

Referring to FIG. 17, as the actuating member 240 is lifted into its unlocked position the protrusions 280 abut the locking plate 248. As the securing post 262 continues to be moved upwardly in the drawing to FIG. 17, the protrusions 280 help to cause the curving corner portions 254 of the locking plate 248 to be flexed away from the ledges 24 of the slat 16, thus freeing the bracket member 220 to be slid longitudinally along its associated slat 16. If the protrusions 280 are incorporated, it is preferred that they be integrally molded with the bracket member housing 230. However, it will be appreciated that the protrusions 280 could be formed on a separate component which is secured by threaded fasteners or other means to the lower surface 246 of the bracket member 220, if so desired.

Figure 19:
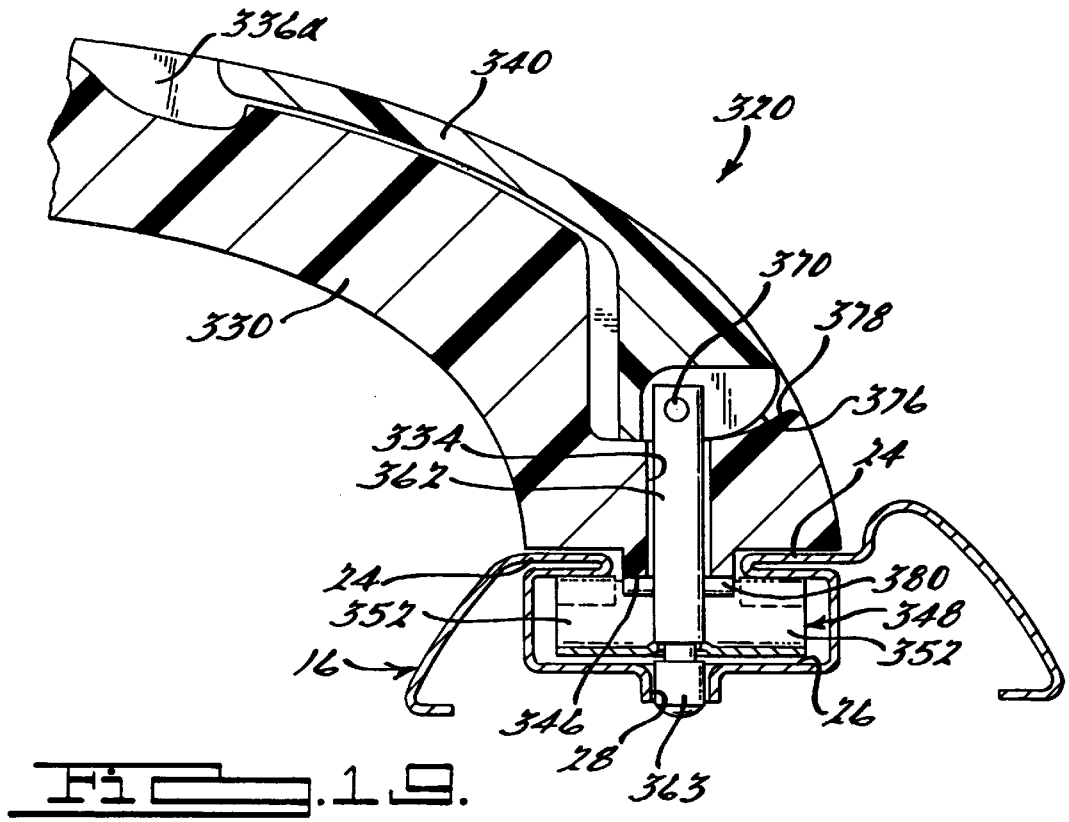
FIG. 19 is a partial side cross-sectional view of the bracket member of FIG. 18 in accordance with section line 19—19 in FIG. 18 showing the bracket member in a locked position.
Figure 20:
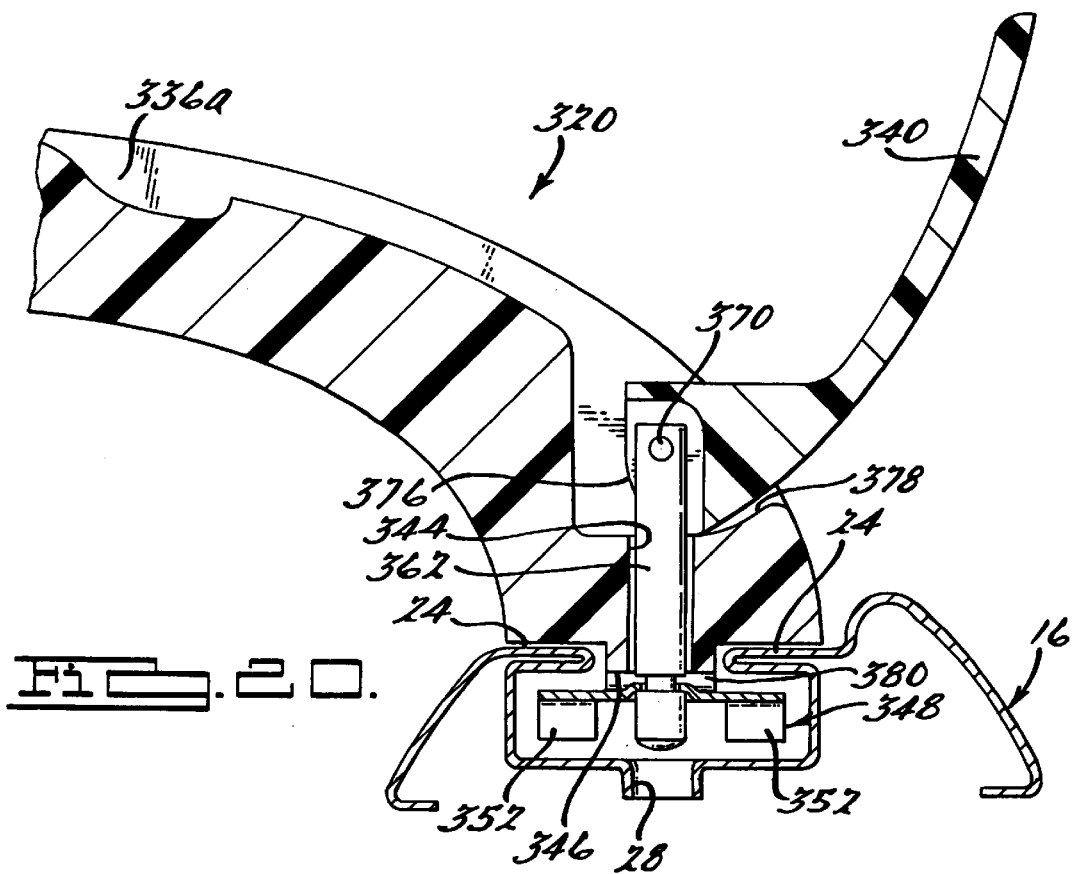
FIG. 20 is a partial side cross-sectional view of the bracket member of FIG. 19 showing the bracket member in an unlocked position.

Referring now to FIGS. 18–20, yet another alternative preferred embodiment 320 of the bracket member of the present invention is illustrated. Again, components of the bracket member 320 which are similar to the bracket member 120 of FIGS. 10–14 are designated by reference numerals increased by 200.

With specific reference to FIG. 18, the bracket member 320 is essentially identical to the bracket member 120 with the exception that the actuating member 340 opens within a plane which is generally perpendicular to the slat 16 rather than generally parallel to the slat 16, as with the bracket member 20 in FIG. 2. The housing 330 also includes a generally vertically disposed recess 336 within which the actuating member 340 is disposed. When in the locked position shown in FIG. 18, the actuating member 340 provides the appearance of a generally integrally formed component and does not detract from the aerodynamic efficiency or aesthetic appeal of the overall design of the bracket member 320.

Referring to FIG. 19, the bracket member 320 also includes a curved portion 378 formed within the recess 336. The actuating member 340 includes a curved end portion 376 which is secured via a locking pin 370 to the securing post 362. The housing 330 can also be seen to include a second recessed portion 336a which helps to enable an individual to grip the actuating member 340 with one or more fingers when the actuating member 340 is to be moved into its unlocked position.

In FIG. 20, the actuating member 340 is shown in its unlocked position with the locking pin 362 having been lifted upwardly to disengage the opening 28 in the slat 16. The function of the bracket member 320 is identical, therefore, with the bracket member 120 with the exception that the actuating member is orientated to be pulled towards the user within a plane extending perpendicular to the direction in which the slat 16 extends.

Referring now to FIGS. 21 and 22, a bracket member 420 in accordance with an alternative preferred embodiment of the present invention is shown. The bracket member 420 is substantially identical to the bracket member 120 shown in FIGS. 10–14, and like components have been designated with reference numerals increased by 300 over those used in connection with FIGS. 10–14. The bracket member 420 differs from the bracket member 120 only in that a recess 482 is formed in the lower surface 446 of the housing 430. The recess 482 is of a shape and depth sufficient to permit the flexible locking plate 448 to be contained therein. It will be noted, however, that the locking plate 448 is shaped slightly differently than the locking plate 148. The locking plate 448 includes end portions 448a which are formed so as to curve towards the ledges 24 of the slat 16 (FIG. 2) when the bracket member 420 is placed on the slat 16. The locking plate 448 is secured to the locking post 462 by inserting a portion of the locking post 462 through the key-shaped opening 450 and moving the locking plate 448 laterally slightly such that portion 450a of the locking plate 448 engages with the groove 464 of the locking post 462. Once assembled, the locking plate 448 is held within the recess 482.

Referring now to FIG. 23, the bracket member 420 is shown in its unlocked or open position. In this position, the actuating member 440 has caused the locking post 462 to be withdrawn from an opening 28 in the bottom wall 26 of the slat 16. In this position, the locking plate 448 is also urged into a flattened or straightened out orientation such that no portion of the locking plate 448 is in contact with the slat 16. This allows the bracket member 420 to be slid easily along the slat 16 and repositioned as needed.

Referring to FIG. 24, when the actuating member 440 is urged into its locked or closed position, the flexible locking plate is allowed to assume its naturally curved orientation. In this position central portions 448b of the flexible locking plate 448 come into contact with upper surfaces 24a of the ledges 24 to provide a biasing force which helps clamp the housing 430 to the slat 16. The clamping is effected as the central portions 448b of the locking plate 448a urge the housing 430 away from the slat 16, causing the T-shaped foot portions 466 to engage the ledges 24. In the locked position shown in FIG. 24, the bracket member 420 cannot vibrate or rattle relative to the slat 16. The locking pin 462 is further engaged within the opening 28 to positively prevent the bracket member 420 from moving slidably along the slat 16.

Referring now to FIG. 25, there is shown an actuating member 440 and a locking pin 462 in accordance with another alternative preferred form of the invention. This embodiment, as well as the embodiments of FIGS. 32 and 36, eliminates the need for the retaining pin, such as retaining pin 370, shown in FIGS. 19 and 20.

With specific reference to FIGS. 25–28, the actuating member 440 includes a pair of curving arm portions 484 with a notch 486 (FIGS. 27 and 28) formed therebetween. With reference to FIGS. 27 and 28, the L-shaped locking pin 462 has a top portion 488 which is slidably inserted into the opening 485 formed by the curving arm portions and until a shaft portion 490 is aligned with the notch 486. At this point the locking pin 462 can be rotated such that the shaft portion 490 is urged into a position extending generally perpendicular to the actuating member 440, as indicated in phantom in FIG. 27. The locking pin 462 is then supported by the actuating member 440 and, when attached to a locking plate such as locking plate 348 in FIGS. 19 and 20, will prevent the actuating member from being removed from its associated bracket housing, such as housing 30 shown in FIG. 2.

The actuating member 440 operates in substantially the same manner as the embodiment 120 shown in FIG. 10, with the exception that no retaining pin such as pin 170 is required to hold the actuating member 440 to the locking pin 462. Accordingly, an end portion 492, indicated in FIG. 27, functions as a camming surface when manually graspable end portion 494 is lifted or lowered by a user. This causes the shaft portion 490 of the locking pin 462 to be raised or lowered.

Referring to FIG. 28, one of the curving arm portions 484 may be formed with a protruding edge 484a. This edge serves to retain the locking pin 462 to the actuating member 440 after the locking pin 462 is initially rotated out to a perpendicular position, as indicated in phantom in FIG. 27. A slight degree of extra force is required when pulling out the shaft portion 490 into the position shown in phantom in FIG. 27 to clear the edge portion 484a. Thereafter, edge portion 484a will not permit the shaft portion 490 to be rotated completely into the retracted position shown in FIG. 27. This aids in the assembly process because the locking pin 462 is not able to be dislodged from the actuating member 440 once inserted and rotated into the position shown in phantom in FIG. 27.

FIGS. 29–31 show locking pins 462', 462" and 462'" in accordance with alternative preferred forms of the locking pin 462. The embodiments of FIGS. 29–31 each form a T-shaped member which is installed in the actuating member 440 of FIG. 25 in the manner described in connection with FIGS. 25–28. The locking pins 462', 462" and 462'" each include slightly different arrangements for engaging a locking plate, such as locking plate 48 in FIG. 2. Locking pin 462' includes a notch 462a'. Locking pin 462" includes a tab 462a" and locking pin 462'" includes a notch 462a'" with a slightly flattened end portion 463. All of these arrangements are adapted to readily engage an opening in a locking plate, such as key-shaped opening 50 in the locking plate 48 shown in FIG. 2. The upper T-shaped portion 462b' of locking pin 462' could be formed by molding plastic around a shaft portion 462c'. Alternatively, T-shaped portion 462b' could be formed as a separate element and secured via a threaded fastener to the shaft portion 462c'.

Referring now to FIGS. 32–34, yet another actuating member 540 and locking pin 562 are shown in accordance with another alternative preferred form of the present invention. With specific reference to FIG. 32, the actuating member 540 includes a recessed area 584 which merges into a bore 586 through a top portion 540a of the actuating member 540. With specific reference to FIGS. 32 and 34, the top portion 540a also includes a notched portion 588. From FIG. 33 it will be noted that the bore 586 does not extend completely through the top portion 540a but rather terminates at point 590, although the bore 586 does open into the notched portion 588.

With further reference to FIGS. 32 and 33, the locking pin 562 includes a shaft portion 562a and a spherical head portion 562b. The locking pin 562 is assembled to the actuating member 540 by inserting the shaft portion 562a through the bore 586. The recessed area 584 provides clearance for the spherical head portion 562b. The locking pin 562 is inserted until the head portion 562b contacts point 590 (FIG. 33), and then the shaft portion 562a is rotated 90° so as to extend perpendicular from the actuating member 540 as shown in FIG. 33.

An alternative form of locking pin 662 is shown in FIG. 35 in which only a partial spherical head portion 662b is included. The assembly of the locking pin 662 to its associated actuating member is identical to the locking pin 562. It will also be noted that locking pin 662 includes a shaft portion 662a having a tab 662c which is used to engage a locking plate such as locking plate 48 shown in FIG. 2.

Referring now to FIGS. 36 and 37, an actuating member 740 and a locking pin 762 are illustrated in accordance with yet another alternative preferred form of the actuating member and locking pin of the present invention. The actuating member 740 includes a recessed area 784 and a generally rectangular-shaped bore 786. As indicated in FIG. 37, the rectangular-shaped bore 786 does not extend entirely through an end portion 740a of the actuating member 740, but still opens into a notched portion 788 formed between a pair of side portions 741.

The locking pin 762 is assembled to the actuating member 740 by inserting a shaft portion 762a thereof through the generally square-shaped bore 786 until a semi-circular, T-shaped head portion 762b thereof engages within the bore 786. From FIG. 37 it will be noted that an inside surface portion 741a of each of the side portions 741 prevents the head portion 762b from passing completely through the head portion 740a of the actuating member 740. Once the head portion 762b is seated fully within the bore 786, the shaft portion 762a is rotated until it is extending generally perpendicular from the actuating member 740, such as shown in FIG. 37.

It will be appreciated then that the embodiments of FIGS. 25–37 all provide for an actuating member and locking pin which does not require a separate retaining pin to hold the locking pin to the actuating member. This further simplifies and reduces the cost of manufacturing and assembly associated with the vehicle article carrier of the present invention.

It will be appreciated that all of the embodiments described herein provide a vehicle article carrier having a plurality of bracket members which are constructed from a relatively few number of component parts, are quickly and easily assembled and, importantly, provide a dual locking action. The dual locking action enables the bracket member to be clamped to the slat to prevent rattle, vibration and other objectionable movement of the bracket member as well as to provide a pin-in-hole positive locking of the bracket member to its associated slat. Advantageously, both of these locking movements are controlled by a single throw of an actuating member. The relatively few number of independent component parts enable the bracket members disclosed herein to be constructed more easily, less expensively, and with less assembly time than other previously designed bracket members.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for transporting articles above an outer body surface of a vehicle, said apparatus comprising:

a pair of slats adapted to be fixedly secured to said outer body surface generally parallel to one another, each of said slats including a longitudinally extending channel;

at least one cross bar having a length sufficient to span the distance between said slats when said slats are fixedly secured to said outer body surface; and a bracket member disposed at each outermost end portion of said cross bar, each said bracket member including:

a housing;

an actuating member for urging said bracket member between locked and unlocked positions;

a flexible locking plate operably secured to said actuating member and having dimensions permitting it to slide freely within said channel of an associated one of said slats;

said flexible locking plate further having first and second ends residing within said channel when said flexible locking plate is in said locked and unlocked positions, a portion of said flexible locking plate between said first and second ends abutting a lower surface of said housing when said flexible locking plate is in said unlocked position; and said locking plate being operable to be flexed into and out of clamping engagement with said channel of an associated one of said slats by movement of said actuating member between said locked and unlocked positions respectively.

2. The apparatus of claim 1, wherein said actuating member comprises a securing post operable to be inter engaged with said flexible locking plate generally at a midpoint of said flexible locking plate; and wherein said housing comprises a camming surface, and wherein said camming surface causes said actuating member and said securing post to be urged towards and away from said housing as said actuating member is urged between said locked and unlocked positions.

3. The vehicle article carrier of claim 2, wherein said actuating member includes an enlarged end portion having at least one integrally formed, generally circumferential groove adapted to engage with said camming surface on said housing.

4. The vehicle article carrier of claim 1, wherein said flexible locking plate comprises a curved portion of spring steel having a plurality of corner portions curving in a first direction and at least one intermediate portion curving in an opposite direction from said corner portions;

said intermediate portion operating to assist flexing of said flexible locking plate when said actuating member is moved between said locked and unlocked positions to cause said corner portions to move in and out of clamping engagement with said associated slat.

5. The vehicle article carrier of claim 4, wherein said flexible locking plate forms a modified S-shape and includes a generally centrally disposed aperture for accepting a portion of said securing post.

6. The vehicle article carrier of claim 1, wherein said housing includes a bottom surface having at least one foot portion for assisting and guiding said bracket member slidably along said channel of said slat; and at least one protrusion on said bottom surface for maintaining said flexible locking plate in a desired orientation relative to said bracket member.

7. The vehicle article carrier of claim 1, wherein said actuating member is moved pivotally within a plane extending generally parallel to said associated slat.

8. The vehicle article carrier of claim 1, wherein said actuating member is moved between said locked and unlocked positions within a plane extending generally perpendicular to said slat.

9. The vehicle article carrier of claim 1, wherein said housing includes a lower surface, and wherein said lower surface includes at least one protrusion for assisting said actuating member in urging said first and second ends of said flexible locking plate out of clamping engagement with said channel of said associated slat when said actuating member is moved into said unlocked position.

10. The vehicle article carrier of claim 1, further comprising a locking pin for operably coupling said actuating member to said flexible locking plate;

said actuating member having an end portion adapted to pivotally support a portion of said locking pin such that said locking pin is moved generally linearly when said actuating member is moved between said unlocked and said locked positions.

11. A vehicle article carrier for transporting articles above an outer body surface of a vehicle, said vehicle article carrier comprising:

a pair of slats adapted to be fixedly secured to said outer body surface generally parallel to one another, each of said slats having a plurality of spaced apart apertures formed in a wall portion thereof;

at least one cross bar having a length substantially sufficient to span the distance between said slats when said slats are fixedly secured to said outer body surface;

a bracket member secured at each outermost end of said cross bar for adjustably positioning said cross bar along said slats;

each said bracket member including:

a housing;

an actuating member secured to said housing and adapted to be manually grasped and moved pivotally between locked and unlocked positions, said actuating member including a securing post adapted to extend through an opening in said housing;

a flexible, curved locking member disposed within an associated one of said slats and being secured to said securing post, said flexible locking member having a first portion and a second portion, said first portion being in clamping engagement with a portion of said slat when said actuating member is in said locked position, said second portion abutting a lower surface of said housing and assisting in causing said first portion to be flexed out of clamping engagement with said slat when said actuating member is moved from said locked position into said unlocked position; and said securing post being urged into one of said apertures when said actuating member is moved from said unlocked position into said locked position and urged out of said aperture when said actuating member is moved from said locked position into said unlocked position.

12. The vehicle article carrier of claim 11, wherein said flexible locking member comprises a generally H-shaped member having a plurality of pairs of first portions and a pair of second portions; and wherein said first portions and said second portions curve generally away from one another.

13. A vehicle article carrier for transporting articles above an outer body surface of a vehicle, said vehicle article carrier comprising:

a pair of slats adapted to be fixedly secured to said outer body surface generally parallel to one another; each of said slats having a plurality of spaced apart apertures formed in a wall portion thereof;

at least one cross bar having a length substantially sufficient to span the distance between said slats when said slats are fixedly secured to said outer body surface;

a bracket member secured at each outermost end of said cross bar for adjustably positioning said cross bar along said slats;

each said bracket member including:

a housing having a recess formed in an outer surface thereof;

an actuating member adapted to be manually grasped and moved pivotably between locked and unlocked positions, said actuating member including a securing post adapted to extend through an opening in said housing and said actuating member being generally flush with an outer surface of said housing when said actuating member is in said locked position;

said housing further including a camming surface formed within said recess and cooper able with said actuating member to cause said securing post to be moved longitudinally when said actuating member is moved between said locked and unlocked positions; and a flexible locking plate secured to said securing post and being of dimensions to enable said flexible locking plate to be disposed within a channel of an associated one of said slats, said flexible locking plate being formed such that first and second portions thereof clampingly engage said channel when said actuating member is in said locked position and said first and second portions being flexed out of engagement by longitudinal movement of said securing post when said actuating member is moved into said unlocked position by abutting contact of third and fourth portions of said flexible locking plate with a lower surface of said housing, and wherein when said actuating member is in said locked position said securing post is engaged with one of said apertures, and when said actuating member is moved into said unlocked position said securing post is caused to be moved out of engagement with said one aperture to enable said bracket member to be adjustably positioned along said associated slat at a desired position.

14. The vehicle article carrier of claim 10, wherein said camming surface comprises a plurality of ramp surfaces for engaging portions of said actuating member for causing said actuating member to be moved longitudinally towards and away from said associated slat when said actuating member is moved pivotally between said locked and unlocked positions.

15. The vehicle article carrier of claim 10, wherein said flexible locking plate comprises an H-shaped member having a plurality of curving corner portions and a pair of curving intermediate portions, said curving corner portions being caused to flex out of clamping engagement with said channel of said associated slat when said actuating member is urged from said locked to said unlocked position.

16. The vehicle article carrier of claim 10, wherein said flexible locking plate is urged into clamping engagement with said channel generally simultaneously with a lowermost end portion of said securing post engaging said aperture in said associated slat when said actuating member is urged into said locked position.

17. The vehicle article carrier of claim 10, wherein said lower surface having a pair of protrusions formed thereon for assisting in urging said first and second portions of said flexible locking plate out of clamping engagement with said associated slat when said actuating member is urged into said unlocked position.

18. A vehicle article carrier for supporting articles above an outer body surface of a vehicle, said vehicle article carrier comprising:

a pair of slats each having a channel formed therein and adapted to be fixedly secured to said outer body surface generally parallel to one another;

at least one cross bar having a length sufficient to substantially span the distance between said slats when said slats are fixedly secured to said outer body surface;

a pair of bracket members secured to outermost ends of said cross bar for supporting said cross bar above said outer body surface of said vehicle and for allowing said cross bar to be adjustably positioned at a desired point along the lengths of said slats;

each said bracket member comprising:
    a housing;
    an actuating member moveable between locked and unlocked positions;
    a securing member moveable by said actuating member;
    a flexible locking member responsive to movement of said securing member and having a non-linear shape;
    said flexible locking member being in clamping engagement with a portion of said slat when said actuating member is in said locked position and being caused to flex out of engagement with said portion of said slat as said securing member is moved by movement of said actuating member into said unlocked position by abutting contact of first and second portions of said flexible locking member with a lower. surface of said housing; and
    wherein said securing member is caused to lockingly engage said slat when said actuating member is in said locked position and to be urged out of locking engagement with said slat when said actuating member is moved into said unlocked position.

19. The vehicle article carrier of claim 18, wherein said securing member is secured to said flexible locking member and causes said flexible locking member to be flexed when said actuating member is moved into said unlocked position; and wherein movement of said actuating member into said unlocked position causes said securing member to be moved out of engagement with said slat thereby permitting said bracket member to be repositioned along said slat.

20. The vehicle article carrier of claim 19, wherein said flexible locking plate includes an H-shaped member having a plurality of curving corner portions and a pair of curving intermediate portions, said curving corner portions being urged out of clamping engagement with said channel when said actuating member is moved from said locked into said unlocked position, and said curving intermediate portions assisting said H-shaped member to be flexed as said actuating member moves into said unlocked position.

21. The vehicle article carrier of claim 19, wherein said lower surface of said bracket member includes a pair of protrusions formed thereon for assisting in the flexing of said flexible locking member when said actuating member is moved between said locked and unlocked positions.

22. A vehicle article carrier for supporting articles above an outer body surface of a vehicle, said vehicle article carrier comprising:

a pair of slats each having a channel formed therein and adapted to be fixedly secured to said outer body surface generally parallel to one another, each of said slats having a plurality of spaced apart apertures;

at least one cross bar having a length sufficient to substantially span the distance between said slats when said slats are fixedly secured to said outer body surface;

a pair of bracket members secured to outermost ends of said cross bar for supporting said cross bar above said outer body surface of said vehicle and for allowing said cross bar to be adjustably positioned at a desired point along the lengths of said slats;

each said bracket member comprising:

a housing having an outer surface including a recess therein, said recess including a camming portion having a plurality of ramp surfaces and an opening extending through said housing and communicating with a lower surface of said housing;

an actuating member shaped so as to fit nestably within said recess, said actuating member having a securing post protruding therefrom, said securing post having a lowermost end portion, said actuating member being movable between locked and unlocked positions;

a flexible locking plate secured to said securing post, said flexible locking plate having dimensions permitting it to be disposed within said channel of an associated one of said slats and to move freely within said channel when said actuating member is in said unlocked position, said flexible locking plate being caused to flex as said actuating member is moved over said ramp surfaces of said camming surface when said actuating member is moved between said locked and unlocked positions to cause said flexible locking plate to disengage said channel, and said flexible locking plate being allowed to flex into clamping engagement with said channel when said actuating member is urged from said unlocked into said locked position; and said securing post including a lowermost end portion which engages within one of said apertures in said slat when said securing post is positioned over said aperture and said actuating member is urged into said locked position; and wherein said securing post engages within said aperture generally simultaneously with said flexible locking plate becoming clampingly engaged with said slat when said actuating member is moved from said unlocked into said locked position, and said securing post becomes disengaged from said aperture generally simultaneously with said flexible locking plate becoming clampingly disengaged from said slat when said actuating member is moved from said locked into said unlocked position.

23. A vehicle article carrier for transporting articles above an outer body surface of a vehicle, said apparatus comprising:

a pair of slats adapted to be fixedly secured to said outer body surface generally parallel to one another, each of said slats including a longitudinally extending channel;

at least one cross bar having a length sufficient to substantially span the distance between said slats when said slats are fixedly secured to said outer body surface; and a bracket member disposed at each outermost end portion of said cross bar, each said bracket member including:
a housing;
an actuating member for placing said bracket member in locked and unlocked positions;
a flexible locking plate having dimensions permitting it to slide freely within said channel of an associated one of said slats;
a locking element for operably coupling said flexible locking plate to said actuating member, said locking element being pivotally coupled to a portion of said actuating member;

said flexible locking plate being flexed in response to movement of said actuating member between said locked and unlocked positions to thereby cause portions of said flexible locking plate to move out of and into clamping engagement with said associated slat, thereby permitting said housing to be moved slidably along said associated one of said slats when said actuating member is in said unlocked position and preventing said housing from being moved when said actuating member is in said locked position, wherein a portion of said flexible locking plate flexibly engages a bottom, substantially horizontal surface of said housing when said actuating member is in said unlocked position.

24. The vehicle article carrier of claim 23, wherein said actuating member includes an end portion having a notched portion; and wherein said locking element comprises a locking pin having a head portion captively retained within said end portion of said actuating member; and wherein said end portion of said actuating member forms a camming surface which causes general longitudinal movement of said locking pin when said actuating member is moved between said locked and unlocked positions.

25. The vehicle article carrier of claim 24, wherein said locking pin generally comprises a shaft portion and a head portion, said head portion forming a generally spherical portion.

26. The vehicle article carrier of claim 24, wherein said locking element comprises a locking pin having a shaft portion and a generally T-shaped head portion.

27. The vehicle article carrier of claim 24, wherein said locking element comprises a locking pin having a shaft portion and a head portion, and wherein said head portion of said locking pin comprises a partial sphere.

28. The vehicle article carrier of claim 24, wherein said locking element comprises a generally L-shaped locking pin having a top portion and a shaft portion, and wherein said top portion is retained within said end portion of said actuating member for pivotable movement relative to said actuating member.

29. A vehicle article carrier for transporting articles above an outer body surface of a vehicle, said apparatus comprising:

a pair of slats adapted to be fixedly secured to said outer body surface generally parallel to one another, each of said slats including a longitudinally extending channel;

at least one cross bar having a length sufficient to substantially span the distance between said slats when said slats are fixedly secured to said outer body surface; and a bracket member disposed at each outermost end portion of said cross bar, each said bracket member including:
a housing having a lower surface;
an actuating member for placing said bracket member in locked and unlocked positions; and
a flexible locking plate, operably secured at an approximate midpoint between opposed longitudinal ends thereof to said actuating member and responsive to movement of said actuating member, and having at least a first portion and at least a second portion said first portion abutting a portion an associated one of said slats when said actuating member is in a locked position, and said second portion abutting said lower surface of said housing when said first portion of said flexible locking plate is flexed out of engagement with said portion of said one associated slat when said actuating member is moved to place said bracket member into said unlocked position.

30. The vehicle article carrier of claim 34 wherein said housing comprises a recess which includes said lower surface;

said flexible locking plate being disposed within said recess so as not to be disposed within said channel;

wherein said at least one first portion of said flexible locking plate clampingly engages an upper surface of said slat when said actuating member is in said locked position, and wherein said at least one first portion is flexibly urged out of contact with said upper surface of said slat and said at least one second portion of said flexible locking plate abuts said lower surface of said housing when said actuating member is in said unlocked position.

* * * * *